United States Patent [19]
Girard et al.

[11] Patent Number: 5,483,108
[45] Date of Patent: Jan. 9, 1996

[54] UNINTERRUPTED DISTRIBUTED STORAGE SUPPLY SYSTEM

[75] Inventors: Jacques Girard, Verrieres Le Buisson; Didier Marquet, Malakoff, both of France

[73] Assignee: France Telecom Etablissement Autonome de Droit Public, Paris, France

[21] Appl. No.: 81,110

[22] Filed: Jun. 25, 1993

[30] Foreign Application Priority Data

Jun. 29, 1992 [FR] France .................................. 9207961

[51] Int. Cl.$^6$ ..................................................... H02J 4/00
[52] U.S. Cl. .............................. 307/64; 307/66; 307/82; 363/37
[58] Field of Search ................................ 307/64–66, 82, 307/151; 363/37, 15, 16

[56] References Cited

U.S. PATENT DOCUMENTS

| | | | |
|---|---|---|---|
| 4,719,550 | 1/1988 | Powell et al. | 307/66 |
| 5,029,285 | 7/1991 | Bobry | 307/64 |
| 5,185,536 | 2/1993 | Johnson et al. | 307/66 |
| 5,229,650 | 7/1993 | Kita et al. | 307/66 |

FOREIGN PATENT DOCUMENTS 2638910  5/1990  France .

OTHER PUBLICATIONS

Revue Generale de l'Electricite, No. 2, Feb. 1989, pp. 17–22, Chigolet, "les Applications des Alimentations Dans les Telecommunications" (With Comments).

EDN Electrical Design News, vol. 33, No. 9, Apr. 28, 1988, pp. 225–231, L. Thorsel, "Mini DC/DC Supplies Simplify Redundancy in Parallel Systems" (With Comments).

Communication & Transmission, No. 4, pp. 59–76, Girard, "Geode: Une Nouvelle Generation d'Alimentations en Energie pour Equipments de Telecommunication"(With Comments).

Liecho Des Recherches, No. 113, 1983, pp. 45–60, Girard, "Geode, un Nouveau Concept de L'Alimentation en Energie des Systemes de Telecommunications" (With Comments).

Revue Generale de l'electricite, No. 2, Feb. 1989, pp. 29–34, Danner, et al., "Ailmentation Statique Sans Interruption a Sortie Continue" (With Comments).

Primary Examiner—Jonathan Wysocki
Assistant Examiner—Peter Ganjoo
Attorney, Agent, or Firm—Oblon, Spivak, McClelland, Maier & Neustadt

[57] ABSTRACT

The invention relates to a supply system, with uninterrupted distributed storage, for sensitive operation systems supplied from the public electric energy distribution network (10) or an emergency power supply (11) producing an equivalent voltage, said system incorporating at least one short term energy reserve supply circuit (30) associated with each supplied system and a medium term energy reserve supply circuit (31) having a reaction delay below the autonomy delay of the short term energy reserve supply circuit.

2 Claims, 3 Drawing Sheets

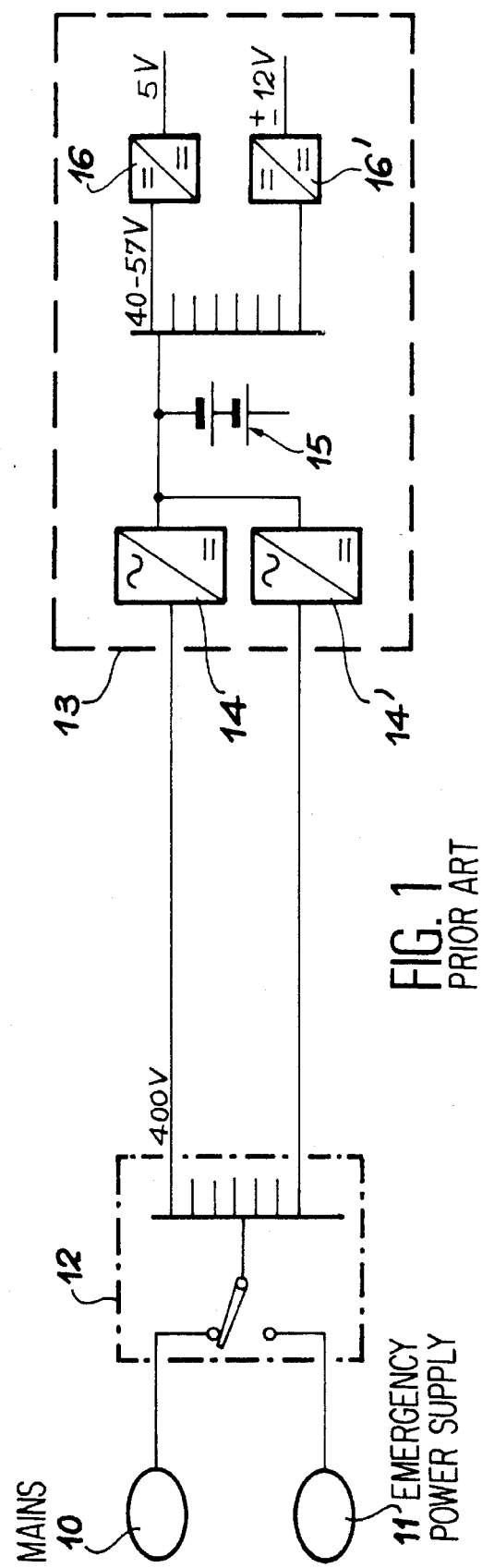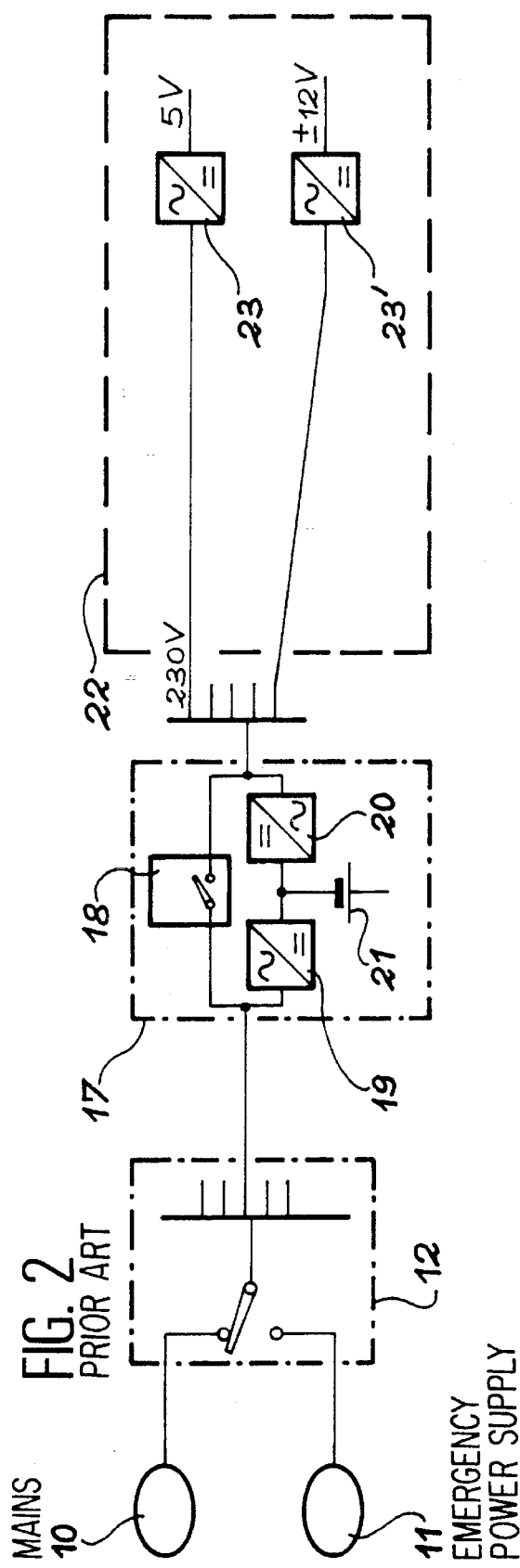

UNINTERRUPTED DISTRIBUTED STORAGE SUPPLY SYSTEM

TITLE OF THE INVENTION

1. Background of the Invention

The present invention relates to an uninterrupted distributed storage supply system.

The field of the invention is the supply of energy supply telecommunication systems or electronic systems operating in a sensitive manner, i.e. which do not tolerate breakdowns or interruptions.

The system according to the invention more particularly applies to conversion procedures for electrical energy (such as the transformation of direct current) into alternating current and transformation of alternating current) into direct current, (to electrical energy storage methods, using recent technological developments in the field) and the appropriate combination of these different methods and technologies.

2. Description of the Related Art

As described in two articles by J. Girard entitled "Géode, un nouveau concept de l'alimentation en énergie des systémes de télécommunications" (Echo des recherches, No. 113, 3rd semester 1983, pp. 45 to 60) and "Geode: a new generation of power plant for telecommunications facilities" (Commutation and transmission, No. 4, 1986), the prior art telecommunications systems like that shown in FIG. 1, are supplied with direct current under a nominal voltage of 48 volts. Based on the public electrical energy distribution network or mains 10 or an emergency power supply 11 producing an equivalent voltage (a.c. voltage 230/400 V), a low voltage panel 12 supplies a three-phase voltage of 400 V and which, after distribution, is received by the system 13 to be supplied incorporating rectifiers 14,14', a storage battery 15 and converters 16,16'. A conversion is carried out so as to produce a d.c. voltage of 48 V, which is used for supplying both the system 13 and for recharging the battery 15. The latter supplies the system, during an a.c. voltage breakdown, for the time necessary for bringing the emergency power supply into operation. The voltage of 48 V is distributed throughout the system to be supplied 13 and converted into several lower voltages compatible with the electronic cards (5 V±12 V, etc).

However, the prior art information processing systems, like that shown in FIG. 2, are usually supplied from centralized uninterrupted supply systems 17. These supplies e.g. comprise a static converter 18, converters 19,20 and a 400 V battery 21. In equipment 22, supply cards 23,23' directly supply the d.c. voltages required by the electronics (5 V,±12 V, ... ) from the 230 V a.c.

Although the prior art systems lead to a very considerable supply security by freeing the supplied systems from the short-comings of the primary a.c. voltage supply, they still suffer numerous disadvantages.

These disadvantages are on the one hand of a technical nature. In telecommunication systems, the need of an a.c. voltage-d.c. voltage conversion for supplying an electrical energy reserve under a voltage of 48 V, reduces the efficiency of the energy chain by 10 to 20%. Moreover, the 48 V used for the remote supply of telephone terminals will not be suitable for future digital terminals. The uninterrupted supplies which supply information processing systems generally have static contactors which guarantee the switching under optimum conditions between the direct supply by the public mains and the supply filtered via input rectifiers, followed by output wigglers (such as inverters). In order to protect the system against switching transients and offer a higher mains filtering level, the latter operating mode is permanently provided. Thus, the efficiency and reliability are those of these three conversion levels in series. They are then inadequate for the supply of sensitive systems.

On the other hand there are disadvantages of an economic nature. The equipments put into place for a.c.-d.c. voltage conversion are dimensioned in order to meet the power requirements of the supplied system and are therefore expensive.

SUMMARY OF THE INVENTION

The invention relates to the production of a distributed storage supply system permitting the supply of sensitive electronic systems through a single conversion level in normal operation.

For this purpose the invention proposes an uninterrupted distributed storage supply system for sensitively operating systems, which is characterized in that it comprises at least one short term energy reserve supply circuit associated with each supplied system and a medium term energy reserve supply circuit having a reaction delay shorter than the autonomy delay of the short term energy reserve supply circuit.

Advantageously, the medium term energy reserve supply circuit comprises a wiggler operating in parallel, i.e. off-line mode. Advantageously, a short term energy reserve supply circuit successively comprises between its input and its output a rectifying and filtering circuit, a conversion circuit, a filtering circuit, an emergency chain comprising a storage circuit, a regulating circuit, a circuit for charging the storage circuit and a control/checking circuit for each of the aforementioned circuits.

In the thus characterized system according to the invention, the distribution of the storage and the use of equipments common to several methods lead to a very high reliability supply principle having reduced overall dimensions and easy maintenance.

Moreover, the use of a general-purpose, uninterrupted supply completed by the use of a simplified operation compared with that of the prior art information processing systems permits a significant reduction in the prime and operating costs of the energy chain. Moreover, the short term storage associated with the converters integrated into the supplied systems leads to no significant extra costs.

Compared with the prior art systems, the system according to the invention leads to a cost saving of 20 to 30% in systems considered on the basis of the distribution panel.

BRIEF DESCRIPTION OF THE DRAWINGS

FIGS. 1 and 2 illustrate two prior art systems.

DETAILED DESCRIPTION OF EMBODIMENTS

Figure 3:
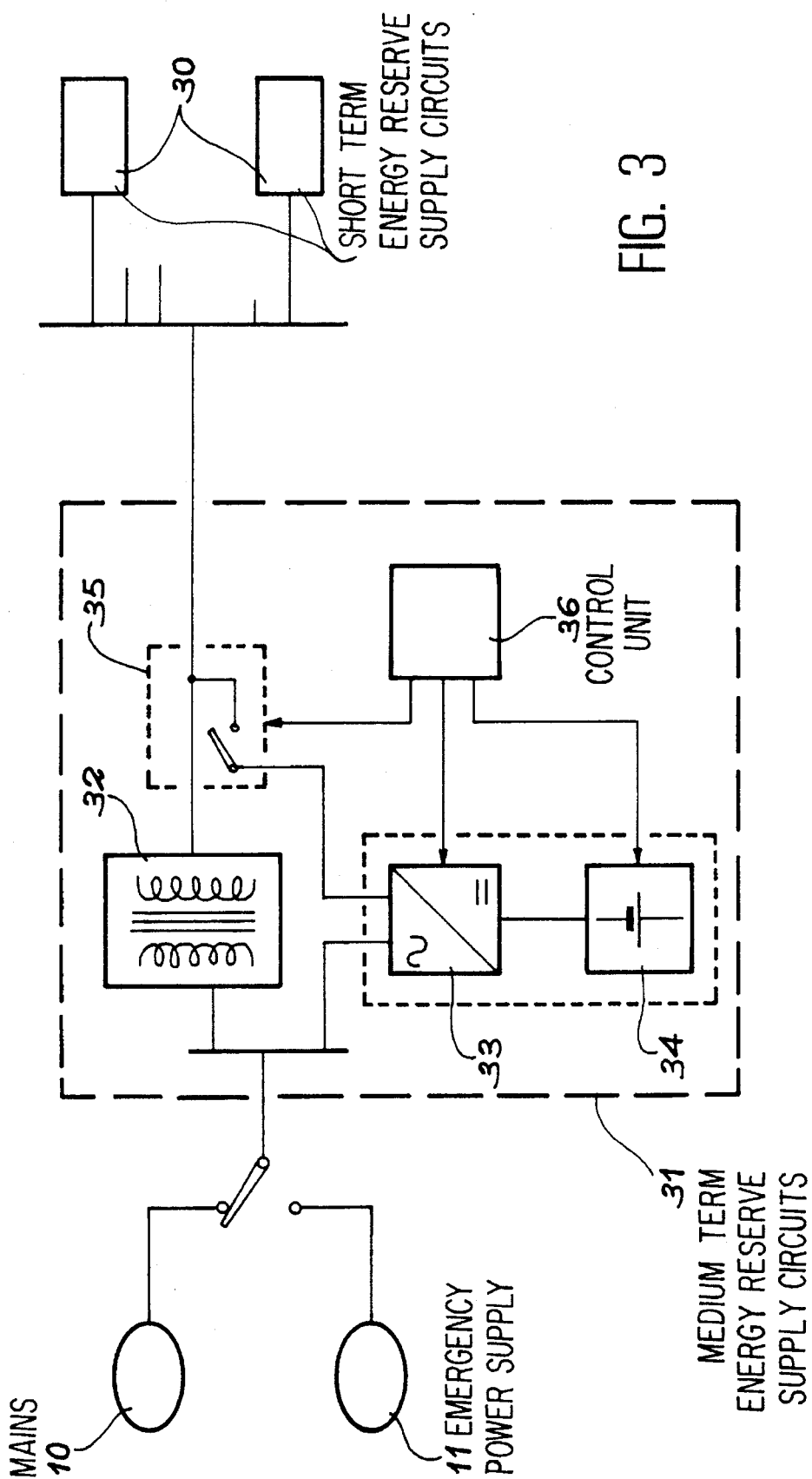
FIG. 3 illustrates the system according to the invention.

The uninterrupted, distributed storage supply system according to the invention for sensitively operating systems, which can be telecommunication or information processing systems is shown in FIG. 3. It has at least one short term energy reserve supply circuit 30 associated with the supplied system and positioned as close as possible thereto, together with a medium term energy reserve supply circuit 31 having a reaction delay shorter than the autonomy delay of the short term energy reserve supply circuit 30, said circuit 31 being located at the central level.

The distribution of the electrical energy 10 and the emergency source 11, which existed in the two prior art means, have been shown with the same references.

The medium term energy storage circuit 31 is associated with a general-purpose conversion device placed on watch and which is responsible for supplying the a.c. voltage whilst awaiting the starting up of the long term emergency power supply 11.

Thus, if the network or mains is interrupted for several minutes, each short term energy reserve supply circuit 30 (below 1 minute) becomes active to permit the switching of the electromechanical contactor 35 of the medium term energy reserve supply circuit 31 (below 1 hour), before starting up the emergency power supply 11. Thus, there is an irreproachable supply quality ($1 \times 10^{-6}$) of the short term energy reserve supply circuits filtering the transients of the network, e.g. below 300 ms.

The medium term energy reserve supply circuit shown in FIG. 3 comprises an isolating transformer 32 whose function is to ensure the safety of personnel and bring about a first filtering of interference of all orders emitted by the distribution network 10, a wiggler 33 operating in parallel or in the off-line mode, associated with a battery 34 bringing about autonomy in the watch state, an electromechanical contactor 35, e.g. of the ordinary type, permitting network-wiggler switching and a control unit 36 making it possible to control these various components.

Figure 4:
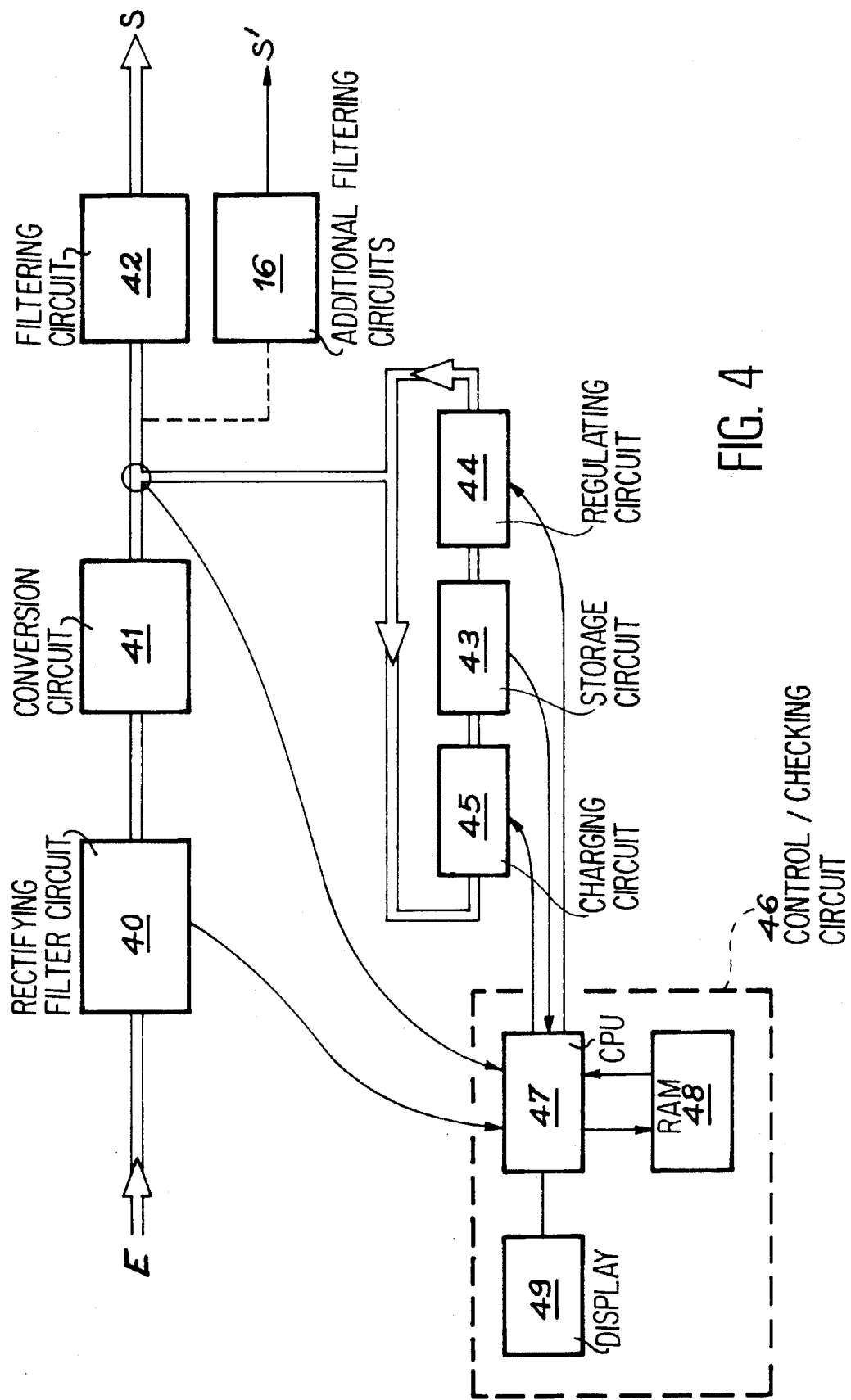
FIG. 4 illustrates a short term reserve supply circuit of the system according to the invention.

Advantageously, said medium term energy reserve supply circuit 31 is obtained by adapting a commercial optimized uninterrupted supply. In particular, the rectifying-filtering function is limited to the recharging of the battery 34 following the operation of the uninterrupted supply as a result of the interruption of the a.c. distribution network 10. As shown in FIG. 4, each short term energy reserve supply circuit 30 successively comprises between its input E (high a.c. voltage) and its output S (low voltage) a rectifying and filtering circuit 40, a conversion circuit 41 and a filtering circuit 42. The circuit 30 also comprises an emergency chain having a storage circuit 43, a regulating circuit 44, a circuit 45 for charging the storage circuit 43 and a control/checking circuit 46 for each of the aforementioned circuits.

In the remainder of the description, each of these circuits will be successively studied.

The rectifying and filtering circuit 40.

This circuit supplies a voltage between 200 and 400 V and makes it possible to maintain the operation of the supplied system for a few minutes following the interruption of the a.c. voltage E and filters the rectified voltage. In a per se known manner, it can be constituted by a diode bridge charging a bank of capacitors. The calling current, during the charging of these capacitors, can be limited by rheostats having a positive temperature coefficient. Once charging has been completed, the average current decreases and the resistance of the rheostats becomes negligible in the circuit. Upstream of the diode bridge, a filter LC can reduce the reinjection of disturbances of a differential nature and common mode.

The conversion circuit 41.

This circuit can be obtained with the aid of a d.c. converter, 300 V/5 V d.c./200 W operating at clipping frequencies between 100 kHz and 1 MHz as a function of the charge and offering an efficiency of 85% under full charge. The input voltage range extends between 200 and 400 V.

The filtering circuit 42.

Filters and protecting circuits located at the output of each circuit 30, but also at the input, limit the outgoing or incoming disturbance levels and isolate the system to be supplied in the case of a failure.

The storage circuit 43.

This circuit 43 can be obtained with the aid of a battery (organized e.g. in the form of two branches of five 1.2 V elements each), in order to obtain 6 V at the output. This two-branch organization makes it possible to have only 15 A in each branch, as well as a storage redundancy. Thus, in the case of a failure of one of the branches, the other can ensure the supply, the autonomy being subdivided by more than two, but remaining in excess of a few minutes.

The regulating circuit 44.

In the embodiment considered here, the voltage at the terminals of each battery branch can vary from 8 V under charge and 5 V at the end of discharge. However, in discharge it is necessary to supply a constant voltage of 5.15 V at the output, hence the need for a regulator for each battery.

As is known to the expert, for bringing about such a regulation it is possible to use one or more MOS transistors, whose transconductance characteristic is considered in order to vary the drain-source voltage. In this case, a differential amplifier can amplify the difference between the reference voltage, obtained from a Zener diode, and the voltage effectively measured at the output of the conversion circuit 41. The reference voltage can be brought to zero by a microprocessor or by a voltage presence detector thus inhibiting the action of the regulator. During supply breakdowns, it is the latter circuit which regulates the output voltage in discharge, whilst the microprocessor limits its duration.

The charging circuit 45 of the storage circuit 43.

This circuit can use one of the three charging methods for a cadmium-nickel battery, i.e. floating mode, rapid charging or slow charging.

The floating mode consists of permanently charging the circuit 43 under a weak current, no matter what the state thereof (charged or discharged). One of the major disadvantages of this method is that the aging of the elements of said circuit 43 is accelerated by permanent overcharging.

Rapid charging consists of charging the circuit 43 under a high current (e.g. 4 amperes) for one hour. This method has the advantage of rapidly recharging the said circuit 43, but accelerates its aging in the same way as the preceding method.

The third solution, which is advantageously adopted, consists of carrying out a slow charging under a weak current, e.g. 0.4 ampere, for e.g. 16 hours. The mean time before failure (MTBF) of the EDF network slightly exceeds 16 hours, which leaves plenty of time for recharging the circuit 43 before a new mains breakdown occurs. In order to satisfy the redundancy criterion of the system in the example considered herein before, each branch of batteries has its own charger. This charger e.g. consists of a small breakdown supply, whose negative feedback is a current closed-loop control. This consequently gives a current generator, which can be between 0 and 0.7 A. This generator is a chopper-voltage increasing means at breakdown operating as from 5.15 V for recharging the batteries. The voltage at the terminals of each branch of batteries can reach 8 V at the end of charging. A remote control can be provided for controlling the recharging from the microprocessor.

The control/checking circuit 46.

This circuit can be formed by a microcontroller, which under a reduced volume makes it possible to have a high calculating power and a high flexibility for control and monitoring purposes. It also facilitates a subsequent addition of new functions.

Circuit 46 performs an absence detection of the mains, maintains the batteries used, e.g. charging for one hour at 0.4 A every day, charging proportional to the discharge time $$T(h)=(t/600)*(I/30)*16$$

detection of defects of the storage circuit 43, e.g. that of the blocks of batteries: voltage <6 V, checking the current and the output voltage:

$$Vs<Vo-10\% \text{ or } Vs>Vo+20\%$$

and display of the voltage and output current.

The analog-digital conversion performed by the system according to the invention takes place relative to an adjustable external reference voltage. The measurements to be carried out by the circuit 46 are of a very varied nature, namely mains voltage: 0 to 20 V (taken after a transformer), battery voltage: 0 to 8 V, output voltage: 5.15 V and output current (measurement of a voltage at the terminals of a shunt): 50 mV. Such a circuit 46 advantageously has a central processing unit 47, a random access memory 48 and a display 49.

Mains absence detection must make it possible to connect the conversion circuit 41 to the storage circuit 43 in the case of a breakdown of the a.c. source and conversely in the case of reestablishment. In known manner, this function can be performed by using threshold detectors. In addition, the function of said circuit 46 is to monitor that no defect occurs on the conversion circuit 41 of a battery which fails. In order to check all these parameters, measurements are performed at the output of the conversion circuit 41.

The control/checking circuit 46 can operate according to a very simple algorithm having a main loop, which can involve the following stages repeated indefinitely: testing mains presence, performing the output voltage conversion, establishing if it does not fall outside the standards, carrying out the conversion of the output current, entering the voltage and current into the memory and detecting a possible defect of the storage circuit 43.

This circuit 46 can also have two clock overflow interruptions and an external interruption. The first interruption can be used for controlling the starting up of daily charges of the charging circuit 45, for calculating the recharging time of the storage circuit 43 as a function of the discharging time and for controlling recharging. The second interruption can be responsible for refreshing the display 49. The third interruption can be an external interruption, initiated by the user if the latter wishes to display a fault. Thus, if a fault has been found by the circuit 46, the user merely has to e.g. press a pushbutton in order to display the nature thereof on the display 49.

Advantageously, the short term energy reserve supply 30 uses a very high energy density d.c./d.c. conversion circuit 41, which has a good efficiency. This voltage converter can therefore be installed on a printed circuit and its heat losses can then be evacuated by thermal convection by means of a suitable cooling device. This conversion circuit 41 also provides the isolation between the high voltage a.c. network (input E) and the low voltage at the output (output S). It must offer a high regulating level of the output voltage S as a function of fluctuations of the input voltage E and charging variations.

With this conversion circuit 41 is associated a short term energy storage circuit 43, rechargeable several hundred times after use. The discharge of this storage device 43 occurs during the switching of the system according to the invention to the medium term energy storage circuit 31.

Advantageously, said short term storage device 30 can use underdimensioned, tight storage batteries. Such batteries are able to supply a very high power, provided that the storage time is limited in order to protect them against any irreversibility. Such an arrangement is very economic. This storage could also be obtained with the aid of very high capacitance capacitors (several Farads), with a reduced volume and able to supply a current of several dozen amperes.

The short term emergency chain constituted by the storage 43, regulating 44 and charging 45 circuits has the originality of being connected at a single point, namely the output of the conversion circuit 41. Therefore said circuit 41 can be a common model and could evolve independently. The emergency chain samples the charging power of the storage circuit 43 on the output of the circuit 41 at its normal voltage. The function of the charging circuit 45 is to make this output voltage compatible with the recharging of the storage circuit 43. It can e.g. be a voltage raising device with non-isolated breakdown and limited current. Coupling comes into effect as soon as the output voltage of the conversion circuit 41 clears a low threshold. The putting into service of a coupling circuit can be anticipated by observing a low level on the input voltage. The function of such a circuit is to maintain a constant voltage at the output during discharging and also limits the discharging time. As soon as the output voltage of the conversion circuit 41 is reestablished, discharging is stopped. Advantageously, said coupling device can be produced in simple manner with the aid of a transistor controlled by a linear regulator, which is in turn controlled by output/input voltage comparators and a discharge time timer. In order to reduce the voltage drop to the minimum (a few dozen mV) at high current (a few dozen amperes), it is advantageous to use a low voltage Mosfet having a very low internal resistance in conduction.

In a special embodiment, the short term reserve supply circuit 30 is a 230 V/5 V/30 A energy reserve supply offering an autonomy of 5 to 10 min on the battery.

In normal operation, the high a.c. voltage of the network is directly converted into a d.c. output voltage by the main energy conversion circuit 41, which can provide an isolation between the input E and the output S. Secondary voltages S' can be obtained by other converters 16 using the main output voltage.

In emergency operation, the storage circuit 43, via the regulating circuit 44, maintains a constant output voltage for a voluntarily limited time, so as not to reduce the life of the storage circuit 43. After reestablishing normal operation, the charging circuit 45 is put into operation until complete charging of the storage circuit 43 has occurred.

Reliability considerations regarding said storage circuit 43 may lead to the duplication of the emergency chain.

In this embodiment, the vital functions are in non-programmed electronics, whilst the high level functions are processed by a microcontroller, which also obtains information via the display 49 on the state of the system according to the invention.

Various improvements to the short term reserve supply circuit are possible, i.e. monitoring can be extended so that it safeguards data measured to enable the latter to be remotely read by means of a teleprocessing network.

Each storage circuit 43 can have battery branches designed in modular manner, namely chargers, regulators and batteries. The actual conversion circuit 41 can be a supply module already provided for operating in parallel with other modules. Thus, if necessary, the power can easily be increased. For example, for a medium capacity telecommunication system connected to 30,000 subscribers, the system according to the invention can have about 100 short term energy reserve supply circuits 30 of 200 W each.

We claim:

1. An uninterrupted, distributed storage supply system for sensitive operating systems supplied from a public electric energy distribution mains or an emergency power supply producing an equivalent voltage, comprising:

a short term energy reserve supply circuit including a rectifying and filtering circuit having an input connected to an input of the short term energy reserve supply circuit and having an output, a conversion circuit having an input connected to the output of the rectifying and filtering circuit and having an output, a filtering circuit having an input connected to the output of the conversion circuit and having an output connectable to any of said operating systems, an emergency chain connected to the input of the filtering circuit including a storage circuit for storing electrical energy, a regulating circuit connected to the storage circuit for regulating the amount of electrical energy outputted to the input of the filtering circuit, a charging circuit for charging the storage circuits, and a control/checking circuit for controlling the emergency chain to output electrical energy from the storage circuit to the filtering circuit for driving any of said operating systems for supplying energy to said operating systems;

a medium term energy reserve supply circuit for supplying energy to said operating systems;

wherein, said short term energy supply circuit supplying energy to said operating systems during a first time when the energy from the mains is initially interrupted;

wherein, said medium term energy supply circuit supplying energy to said operating systems during a second time, longer than the first time, and the short term energy supply circuit no longer supplies energy to the operating systems;

wherein, said medium term energy supply circuit has a reaction delay shorter than the autonomy delay of the short term energy reserve supply circuit so that when the medium term energy supply circuit supplies energy to the operating systems a switching noise is reduced.

2. The system according to claim 1, wherein the medium energy reserve supply circuit further comprises:

an inverter operating in parallel/off-line mode.

* * * * *